United States Patent [19]
Furuta

[11] 3,722,386
[45] Mar. 27, 1973

[54] FRAME COUNTER FOR CAMERAS
[75] Inventor: Koichi Furuta, Tokyo, Japan
[73] Assignee: Nippon Kogaku K.K., Chuo-ku, Tokyo, Japan
[22] Filed: May 3, 1971
[21] Appl. No.: 139,624

[30] Foreign Application Priority Data

June 9, 1970   Japan..................45/49139

[52] U.S. Cl. .............................95/31 DS, 95/31 R
[51] Int. Cl. ...........................................G03b 1/66
[58] Field of Search ..........................95/31 R, 31 DS

[56]    References Cited

UNITED STATES PATENTS 3,507,197   4/1970   Prochnow et al.................95/31 R
3,613,540   10/1971  Nakamura.........................95/31 R
3,426,665   2/1969   Maeda..............................95/31 R
2,967,471   1/1961   Sommermeyer...................95/31 R
3,073,229   1/1963   Madge..............................95/31 DS
2,926,424   3/1960   Weiss................................95/31 R Primary Examiner—Samuel S. Matthews
Assistant Examiner—Russell E. Adams, Jr.
Attorney—Ward, McElhannon, Brooks & Fitzpatrick

[57]    ABSTRACT

A frame counter for cameras of the type provided with an automatic return film counter, which can display the number of photographed frames for either ordinary film having a thickness of 0.14 mm, and thin film having a thickness of the order of 0.07 mm, thereby enabling any of these different films to be used with the cameras.

5 Claims, 12 Drawing Figures

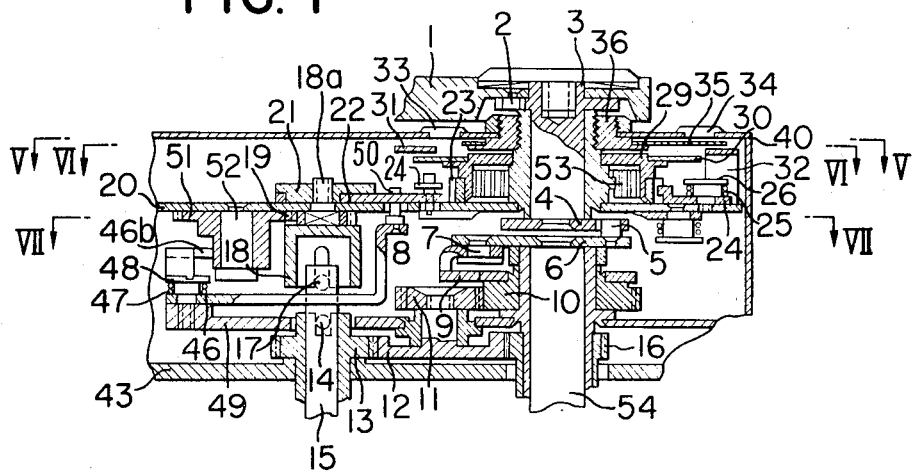

FIG. 7
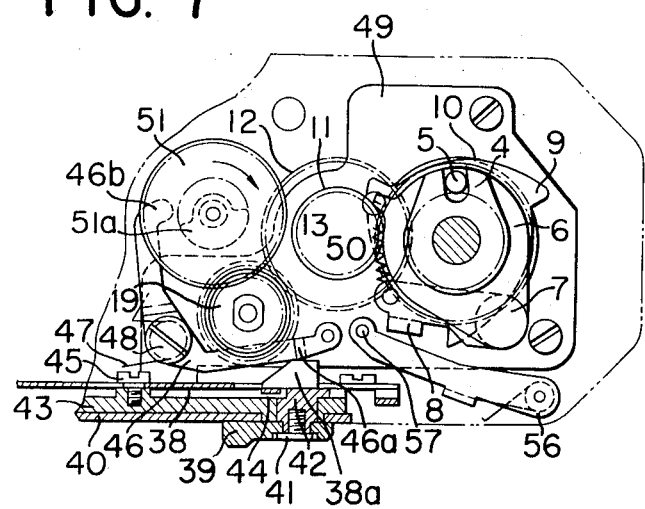
FIG. 8
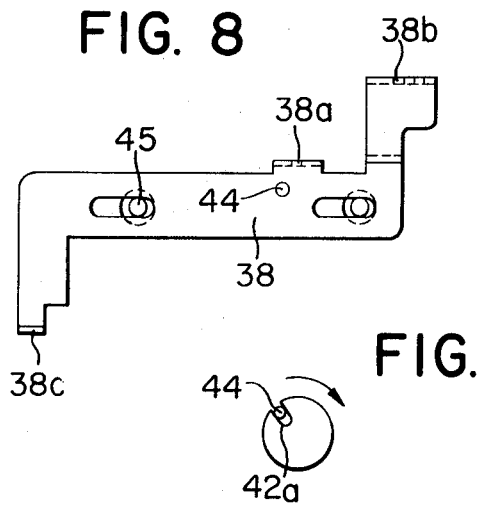
FIG. 9

3,722,386

FRAME COUNTER FOR CAMERAS

BACKGROUND OF THE INVENTION

1. Field of the Invention

This invention relates to a film frame counter for cameras, and more particularly to such a counter which can display the number of exposed frames of films having different thicknesses so that a variety of films can be used with a single size of film magazine.

2. Description of the Prior Art

The film usually used with cameras has a net thickness of about 0.14 mm, but the thickness of the film may be reduced to the order of 0.07 mm by improving the film base or the like; and, in fact, such a thin film is already used for some special purposes. A commercially available film magazine capable of containing 35 to 40 frames of ordinary 35 mm film (0.14 mm thickness) would be able to contain about 70 to 80 frames of the thin film (0.07 mm thickness). Therefore, if the film magazine for the ordinary film of 0.14 mm thickness were made to contain the thin film of 0.07 mm thickness, the number of frames would be nearly double that obtained by the ordinary film of 0.14 mm thickness contained in the same film magazine. This means that the number of frames could be increased without varying the size of the film magazine, or consequently of any existing camera and, of course, the need for film replacement would be less frequent. Such an advantageous thin film, however, is incapable with existing cameras whose frame counter is directed exclusively for use with the ordinary 35 mm film (0.14 mm thickness) which will only provide 35 to 40 frames.

SUMMARY OF THE INVENTION

In view of the above-noted situations, the present invention seeks to provide, in cameras of the type equipped with an automatic return film counter, a frame counter which can display the number of photographed frames for either thicker film having a thickness of 0.14 mm or thinner film having a thickness of the order of 0.07 mm.

According to the present invention, the frame counter comprises a frame scale dial provided with two frame scales for the said two different films, these two frame scales consisting of divisions corresponding to equal angles of rotation. A cam formed with a predetermined cam surface is rotatably mounted on the body of the camera and is associated with a film wind shaft for rotation therewith at a predetermined ratio of rotation. A control lever is provided between the cam and a frame counter feed pawl or a frame counter stop pawl so that one end of the control lever is urged into contact with the cam and the other end of the control lever is urged into contact with the frame counter feed or stop pawl by spring or like means so as to engage and disengage the frame counter feed or stop pawl with a ratchet associated with the automatic return film counter in response to the rotary action of the cam. There is further provided an operating member exteriorly of the camera body for retracting the control lever from the cam and the frame counter feed or stop pawl against the force of the spring or like means.

BRIEF DESCRIPTION OF THE DRAWINGS

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompany drawings, forming a part of the specification wherein:

FIG. 1 is a vertical cross-sectional view of the frame counter according to an embodiment of the present invention;

FIG. 2 is a cross-sectional view showing the portion of FIG. 1 which is located behind the body of the camera;

FIG. 3 is a rear view of the portion shown in FIG. 2;

FIG. 7 is a cross-sectional view taken along plane VII—VII in FIG. 1;

FIG. 8 is a front view of the slide plate;

FIG. 9 is a view illustrating the engagement between the slide plate pin and the change-over lever shaft;

DESCRIPTION OF THE PREFERRED EMBODIMENT

Figure 4:
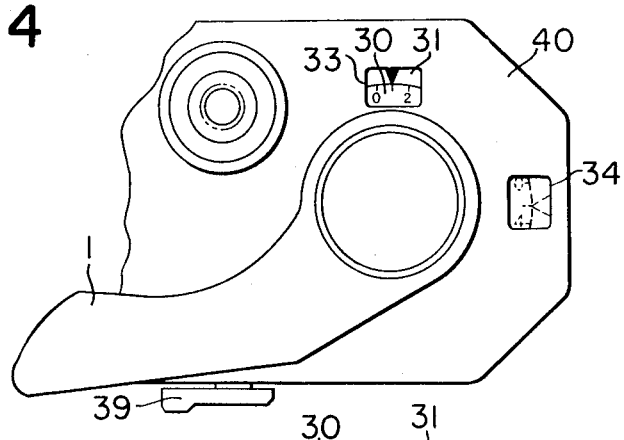
FIG. 4 is a top plan view of the apparatus of FIG. 1.

Referring to FIGS. 1 to 7, there are shown various members such as a wind lever 1, wind lever pin 2, a wind interlocking shaft 3, a wind interlocking plate 4, a wind pawl mount pin 5, a wind pawl mount 6, a wind pawl shaft 7, a wind pawl 8, a three-blade cam 9, a wind gear 10, idle gears 11 and 12, a sprocket gear 13, a sprocket pin 14, a sprocket shaft 15, a spool gear 16, a frame counter interlocking pin 17, a frame counter interlocking cylinder 18, a control gear 19, an upper base plate 20, an eccentric disc 21, a frame counter feed pawl 22, a ratchet 23, a frame counter stop pawl 24, a stop pawl spring 25, a stop pawl screw 26, a feed pawl spring 27, a feed pawl spring screw 28, a frame counter holder ring 29, a frame counter release lever 56 and a release pin 57. These members 1 to 29, 56 and 57 are arranged in the same manner as in known mechanism of the type to which the present invention is related.

More specifically, the mechanism is such that during a film winding operation the rotation of wind lever 1 is transmitted through wind lever pin 2, wind interlocking shaft 3, wind interlocking plate 4, wind pawl mount pin 5 to wind pawl mount 6 having wind pawl 8 mounted thereon by means of wind pawl shaft 7, thus rotating the three-blade cam 9 via wind pawl 8. Wind gear 10, which is secured integrally to the three-blade cam 9, is also rotated with the cam 9, thereby rotating the sprocket gear 13 via idle gears 11 and 12 while rotating the sprocket shaft 15 and sprocket pin 14, thereby to rotate a film wind sprocket (not shown). On the other hand, the rotation of the idle gear 12 is also transmitted to the spool gear 16 to rotate a spool (not shown) to thereby feed a film for an amount corresponding to one frame. The gear ratio may be set, for example, such that one rotation of the sprocket gear 13 results in the feed of one frame. The frame counter interlocking pin 17 is secured to the sprocket gear 13, and is received in a slot formed in the frame counter interlocking cylinder 18 so as to rotate the latter upon rotation of the sprocket shaft 15. The frame counter interlocking cylinder 18 is rotatably held on the upper base plate 20 and has the control gear 19 secured integrally thereto. The frame counter interlocking cylinder 18 also has a threaded portion 18a for securing the eccentric disc 21 integrally to the cylinder 18. The eccentric disc 21 is engaged by the frame counter feed pawl 22 and may be shifted to and from pawl actuating position by the eccentric surface of the disc 21 upon rotation of same as the sprocket shaft 15 rotates while the pawl 22 is biased by the feed pawl spring 27 (FIGS. 5 and 6) engaging a spring receiving pin 55 pegged in the pawl 22, and thus the ratchet 23 may be rotated by an annular distance determined by the length of one tooth. The feed pawl may alternatively employ any known actuating means instead of utilizing the rotation of the sprocket shaft. The ratchet 23 is secured to the frame counter holder ring 29 (FIGS. 1 and 2) for rotation with a frame scale dial 30 attached to the upper side of the frame counter holder ring 29.

Figure 5:
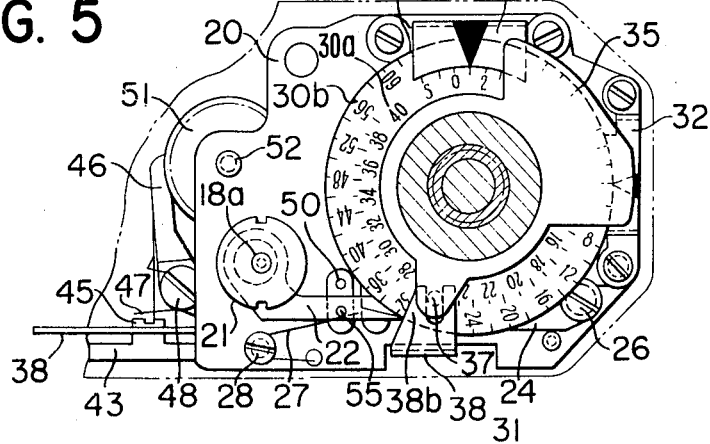
FIG. 5 is a cross-sectional view taken along plane V—V in FIG. 1.
Figure 6:
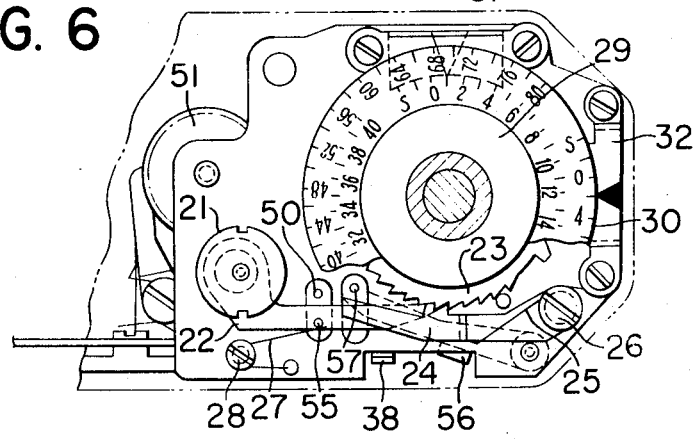
FIG. 6 is a cross-sectional view taken along plane VI—VI in FIG. 1.
Figure 11:
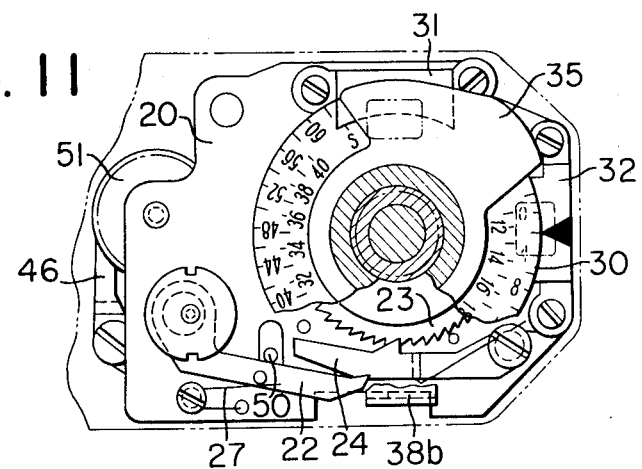
FIG. 11 is a cross-sectional view similar to FIGS. 5 and 6, but showing the arrangement of parts when a thin film is used.
Figure 12:
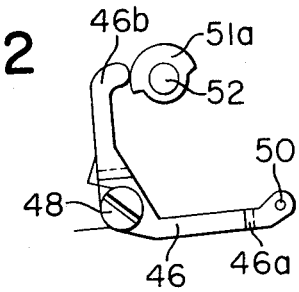
FIG. 12 is a view illustrating the engagement between the control lever and the rotary cam.

The ratchet 23, the frame counter holder ring 29 and the frame scale dial 30 together constitute a conventional automatic return film counter. Whenever the back cover 58 (FIG. 3) of the camera is opened, the action of the frame counter release lever 56 and release pin 57 (FIG. 6) operatively associated with the camera's back cover 58 cause the frame counter feed pawl 22 and stop pawl 24 to be disengaged from the ratchet 23 and automatically returned to their initial positions by the force of a frame counter spring 53 spirally wound around the shaft 3. In the present invention, and as shown in FIGS. 5, 6 and 11, the frame scale dial 30 is provided with two scales 30a and 30b for an ordinary film of 0.14 mm thickness and a thin film of 0.07 mm thickness, respectively. The divisions of these two scales 30a and 30b are selected to correspond to equal angles of rotation of the frame scale dial 30. Also, each division of the ordinary film frame scale 30a represents one frame of the ordinary film, and each division of the thin film frame scale 30b represents two frames of the thin film. Index mark plates 31 and 32 and frame counter windows 33 and 34 are provided for the ordinary film and the thin film, respectively.

As shown in FIGS. 1 and 2, a frame counter window change-over plate 35 is rotatably fitted to a change-over plate 35 holder ring 36. The frame counter window change-over plate 35 has fixed thereto a change-over plate pin 37 (FIG. 5) which is received in the bifurcated portion 38b of a slide plate 38 so as to be moved with the sliding motion of the slide plate 38 to thereby actuate the frame counter window change-over plate 35. In FIGS. 7 and 8, the slide plate 38 is shown slidably mounted on a slide plate screw 45 secured to the body 43 of the camera, and has an engaging portion 38a for engaging the bend 46a of the control lever 46.

The slide plate 38 is also formed with a connecting portion 38c for actuating a film pressing plate (not shown) so as to adjust the spacing between a film rail (not shown) and the film pressing plate in accordance with the thickness of the film used. A change-over lever 39 (FIGS. 2, 3, 4 and 7) is secured to a change-over lever shaft 42 by means of a change-over screw 41, the change-over shaft 42 being rotatably mounted on the camera body 43. Thus, the change-over lever 39 may be changed over between an ordinary film index mark 40a and a thin film index mark 40b provided on an upper cover 40, as shown in FIG. 3. The change-over lever shaft 42 has a recess 42a formed at one end thereof (FIGS. 2 and 9) for receiving a slide plate pin 44 secured to the slide plate 38 so that the movement of the change-over lever 39 may be transmitted to the slide plate 38. Thus, the aforesaid slide plate 38, change-over lever 39, changeover screw 41, change-over shaft 42, slide plate pin 44 and slide plate screw 45 together constitute an operating assembly.

The control lever 46 (FIGS. 1, 5, 7, 10, 11 and 12) is rotatably mounted on a lower base plate 49 by means of a control lever screw 48 and biased by a control lever spring 47 so that the bend 46a of the control lever 46 is engaged with the engaging portion 38a of the slide plate 38. Thus, the stop position may be varied by the sliding motion of the slide plate 38. The control lever 46 has a control lever pin 50 secured to one end thereof for engaging and disengaging the frame counter feed pawl 22 with the ratchet 23 in response to the movement of the control lever 46. A cam gear 51 is rotatably mounted on the upper base plate 20 by means of a cam gear shaft 2, and this cam gear 51 is in mesh engagement with the control gear 19 for rotation therewith at a ratio of 1 : 2. The cam gear 51 is formed with a rotary cam 51a comprising a concave and a convex portion each having a center angle of 180°, so that the control lever 46, having the other end 46a thereof engaged with the rotary cam 51a, may perform its one cycle of operation for two full rotations of the sprocket shaft 15. A film wind shaft is provided, as indicated at 54.

In the above-described arrangement, when an ordinary film is used, the change-over lever 39 is first registered with the ordinary film index mark 40a, as shown in FIG. 3. The slide plate 38 is then in the position, as shown in FIG. 7, where the engaging portion 38a thereof urges the control lever 46 at one end 46a thereof against the force of the spring 47 so that the control lever pin 50 is brought into the position, as shown in FIG. 5 or 6, whereby the frame counter feed pawl 22 is allowed to move without being limited, thereby feeding the ratchet 23. Additionally, the frame counter window change-over plate 35 is brought into the position of FIG. 5 by the bifurcated portion 38b of the slide plate 38 acting on the change-over plate pin 37, as heretofore described, whereby the thin film frame counter window 34 is shut while the ordinary film frame counter window 33 is opened to display the ordinary film frame scale 30a, as shown in FIG. 4.

Figure 10:
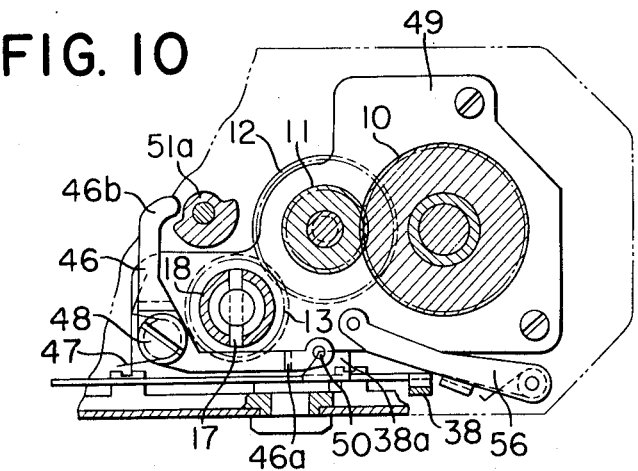
FIG. 10 is a cross-sectional view similar to FIG. 7, but showing the arrangement of parts when a thin film is used.

On the other hand, the other end 46b of the control lever 46 is deviated from the path of the rotary cam 51a of the cam gear 51, as shown in FIG. 7, so that no rotational movement of the sprocket shaft 15 is transmitted to the control lever 46 and accordingly, the frame counter feed pawl 22 is unaffected. Thus, in the position described above, the frame scale dial 30 is fed by one division in response to one film winding operation.

Where a thin film is used, the change-over lever 39 is rotated in the direction, as indicated by an arrow in FIG. 3, until it is registered with the thin film index mark 40b. This causes the slide plate 38 to be moved to the position, as shown in FIG. 10, thereby releasing the engagement between the engaging portion 38a of the slide plate 38 and the bend 46a of the control lever 46. Thus, the control lever 46 is biased by the control lever spring 47 in a clockwise direction, as viewed in FIGS. 5, 6 and 7, so as to allow the control lever pin 50 to force the frame counter feed pawl 22 into disengagement from the ratchet 23, as shown in FIG. 11. Accordingly, in this position, the ratchet 23 is not rotatable even if an effort is made to effect a film winding operation. Also, the frame counter window change-over plate 35 is rotated counter-clockwise by the bifurcated portion of the slide plate 38 so as to assume the position, as shown in FIG. 11, whereupon the ordinary film frame counter window 33 is shut while the thin film frame counter window 34 is opened to display the thin film frame scale 30b.

On the other hand, the other end 46b of the control lever 46 is biased by the control lever spring 47 so as to engage the rotary cam 51a of the cam gear 51, as shown in FIG. 10. Therefore, when the cam gear 51 is rotated in response to the rotation of the sprocket shaft 15, the control lever 46 causes the frame counter feed pawl 22 to be intermittently disengaged from the ratchet 23 with the aid of the control lever pin 50 due to the camming action of the rotary cam 51a. In other words, when the film is wound with the end 46b of the control lever 46 engaged with the concave portion of the rotary cam 51a, the frame counter feed pawl 22 is not in engagement with the ratchet 23, which is thus not actuated, whereby the film is fed by one frame with the frame scale dial 30 remaining stationary. When the film is wound with the end 46b of the control lever 46 engaged with the convex portion of the rotary cam 51a, the frame counter feed pawl 22 is in engagement with the ratchet 23, which is rotated a distance determined by the length of one tooth, and accordingly the frame scale dial 30 is moved by one division of the thin film frame scale 30b. Thus, the frame scale dial 30 is advanced by one division in response to each two-frame feed of the thin film.

In the illustrated embodiment of the present invention, the movement of the control lever 46 is associated with the frame counter feed pawl 22 through the control lever pin 50 to achieve the intermittent feed of the ratchet 23, but it will be apparent to those skilled in the art that the intermittent feed of the ratchet 23 and accordingly of the frame scale dial 30, may also be accomplished by operatively associating the control lever 46 with the frame counter stop pawl 24 so that the stop pawl 24 is engaged and disengaged with the ratchet 23.

According to the present invention, as described above, the number of photographed frames can be displayed by a simple change-over operation for either of ordinary film having the thickness of 0.14 mm or thin film having the thickness in order of 0.07 mm. Moreover, in spite of the increased number of frames, the frame feed can be effected with the same angle of rotation as that used in the conventional frame counter and there is no need to provide finer divisions of the frame scale than in the prior art, nor to provide any special mechanism of high precision. Thus, the frame counter of the present invention can be fabricated, assembled and adjusted in the same way as the conventional one, and this is highly useful in practice.

I claim:

1. A frame counter for a camera available for selectively using both a long and a short film, comprising:
   means for winding the film;
   an indicating plate mounted for rotation on the camera body and provided with first and second frame scales located on the surface of the indicating plate and circumferentially arranged in two rows;
   a first index mark for co-operating with the first frame scale;
   a second index mark for cooperating with the second frame scale;
   a first aperture provided in an upper cover of the camera body for enabling the first index mark and the first frame scale to be seen from the exterior;
   a second aperture provided in an upper cover of the camera body for enabling the second index mark and the second frame scale to be seen from the exterior;
   a covering plate mounted for rotation between said upper cover and the indicating plate on the camera body, for selectively covering the first and second apertures;
   a ratchet fixed on the indicating plate;
   a pawl member biased to engage with the ratchet and associated with the film-winding means to rotate the indicating plate in synchronism with the winding of the film;
   a control lever pivotally movable between a first position, in which the control lever is engaged with the pawl member to release it from the ratchet, and a second position in which the control lever is disengaged from the pawl member;
   a cam member mounted for rotation on the camera body and associated with the film-winding means; the control lever being biased to engage with said cam member, and the cam member engaging with the control lever in the first position thereof to reciprocate the control lever between the first and second positions thereof once every rotation of the cam member so that the indicating plate is rotated by the pawl member once every rotation of the cam member;
   manually operable change-over means operatively connected to said covering plate and the control lever and movable between a first position, in which the covering plate covers the second aperture and the control lever is moved to the second position thereof, and a second position in which the covering plate covers the first aperture and the control lever is moved to the first position thereof.

2. The frame counter according to claim 1, wherein said first frame scale is provided for the short film and said second frame scale is provided for the long film.

3. The frame counter according to claim 2, wherein each division of the first frame scale represents one frame of the short film, and each division of the second frame scale represents two frames of the long film.

4. The frame counter according to claim 1, wherein said pawl member is synchronized with the film-winding means to rotate the indicating plate by one division of the first frame scale by operation of the winding means for advancing one frame of film, whereby the first frame scale and the first index mark is seen through the first aperture when the change-over means is in the first position thereof.

5. The frame counter according to claim 4, wherein the cam member is associated with the film-winding means to rotate by the operation of the winding means to advance two frames of film, and the cam member comprises a first cam surface adapted to engage the control lever in the first position thereof to retain same in said first position, and a second cam surface adapted to engage the control lever to displace same into the second position thereof and to retain it in said second position thereof, whereby the indicating plate is rotated by one division of the second frame scale by the operation of the winding means for advancing two frames of film and the second frame scale, and the second index mark is seen through the second aperture when the change-over means is in the second position thereof.

* * * * *